S. P. BLANCKENSEE.
CUTTING OR SAWING MACHINERY.
APPLICATION FILED JAN. 19, 1918.
1,336,501. Patented Apr. 13, 1920.
3 SHEETS—SHEET 1.
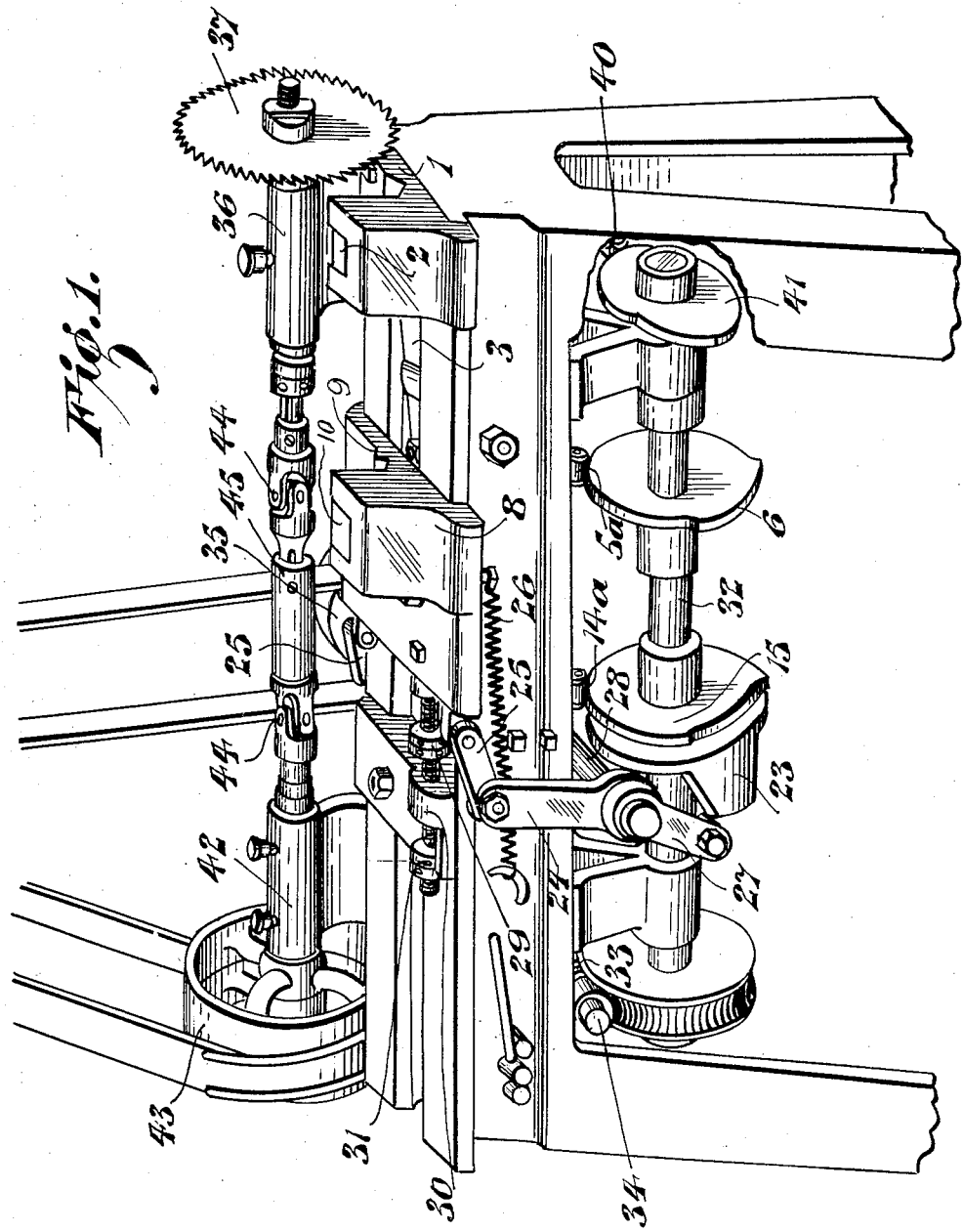

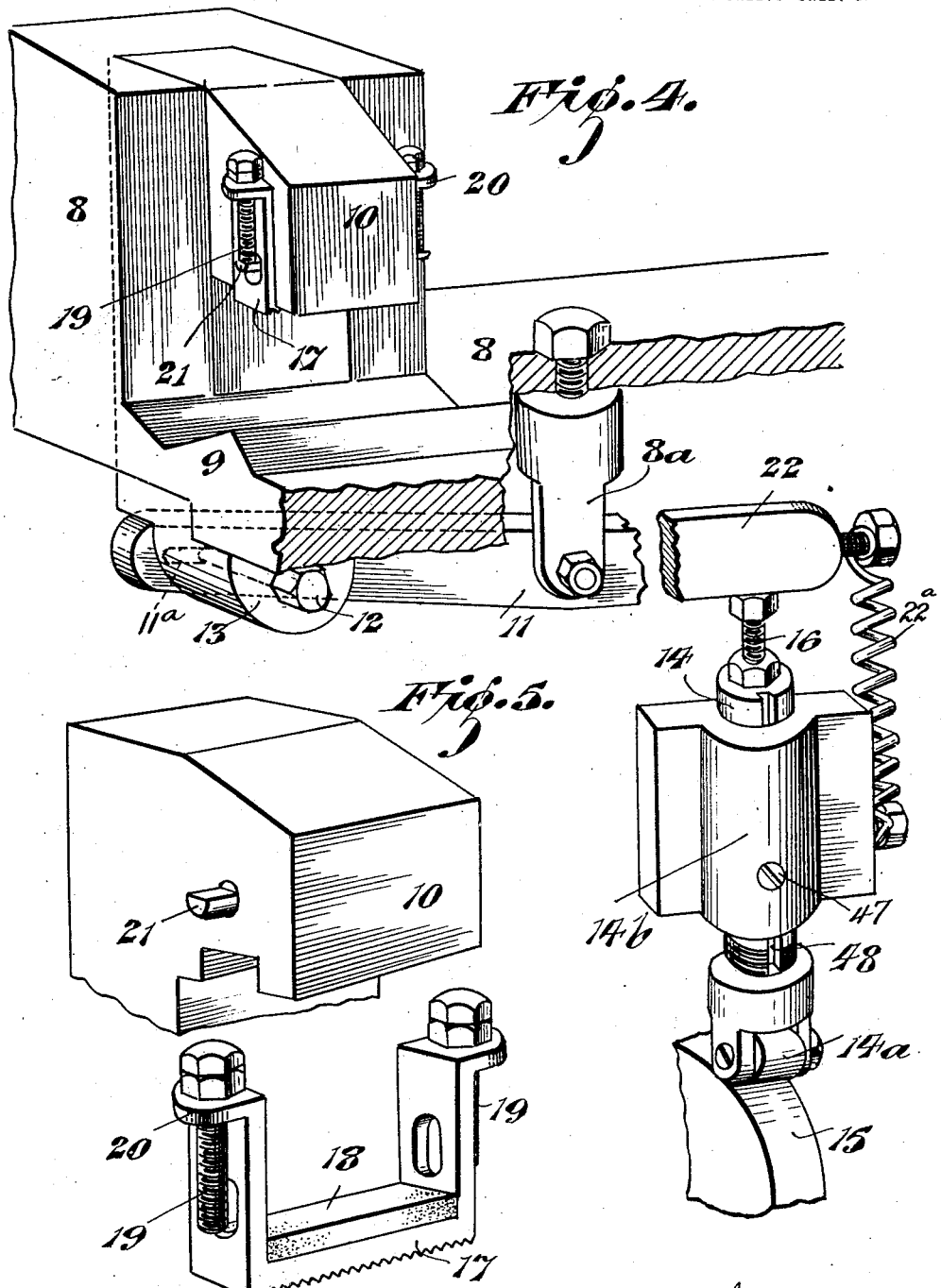

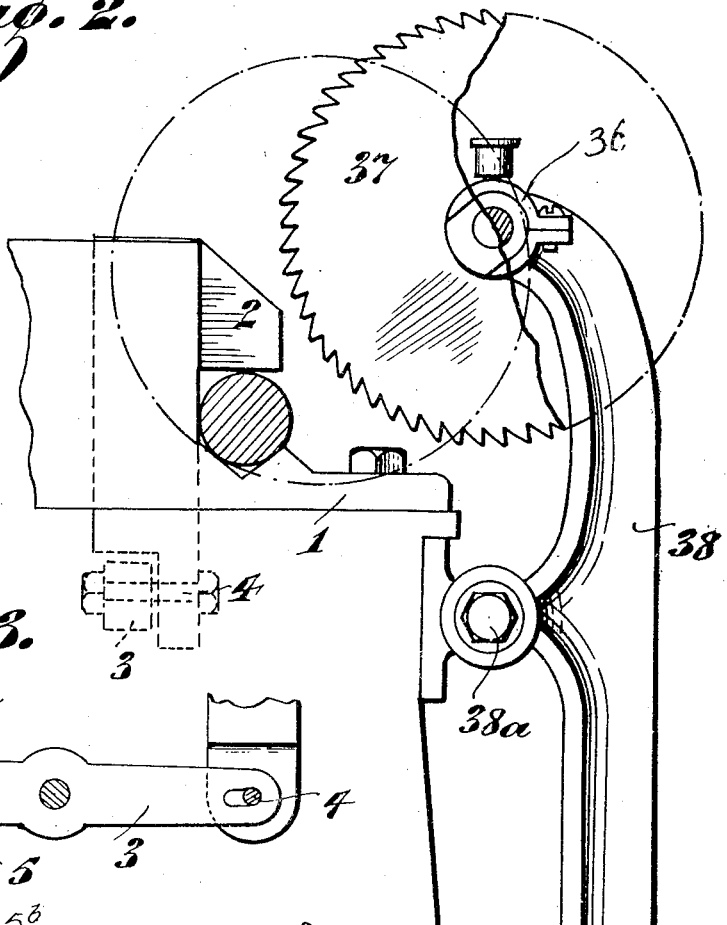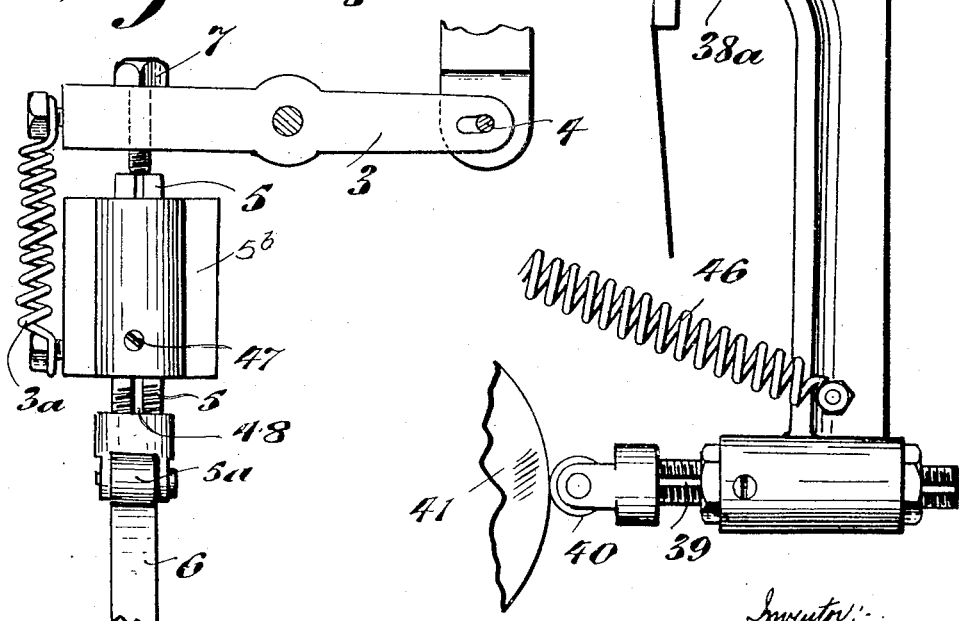

UNITED STATES PATENT OFFICE.

SIDNEY P. BLANCKENSEE, OF BIRMINGHAM, ENGLAND.

CUTTING OR SAWING MACHINERY.

1,336,501.      Specification of Letters Patent.      Patented Apr. 13, 1920.

Application filed January 19, 1918. Serial No. 212,683.

*To all whom it may concern:*

Be it known that I, SIDNEY PHILIP BLANCKENSEE, a subject of the Kingdom of Great Britain, residing at 14 and 15 Frederick street, Birmingham, in the county of Warwick, England, managing director, have invented certain new and useful Improvements in or Relating to Cutting or Sawing Machinery, of which the following is a specification.

This invention comprises certain improvements in or relating to cutting or sawing machinery.

According to the present invention a rod or the equivalent from which it is desired to successively cut or saw lengths is fed and held by the use of two chucks or gripping devices. One of these devices is adapted to move longitudinally of the rod or member in the feeding process and to grip the rod or member in its longitudinal movement in one direction; the other chuck or gripping member is adapted to grip or retain the rod or member after it has been fed.

The saw or cutter is a circular one carried by an oscillatory arm adapted to be displaced toward and away from the work in a direction transversely to the axis of the saw. The saw receives its motion from a relatively stationary axis through the medium of a shaft involving a universal joint or joints.

In order that this invention may be clearly understood and readily carried into practice, reference may be had to the appended explanatory three sheets of drawings, upon which:—

Figure 1 is a perspective view of a machine according to the present invention.

Fig. 2 is a part side elevation of the machine shown in Fig. 1.

Fig. 3 is an elevation of mechanism coöperating with a part shown in Fig. 2, the aspect of elevation being at right angles to that in the case of Fig. 2.

Fig. 4 is a rear perspective view of part of the mechanism shown in Fig. 1.

Fig. 5 is a fragmentary view illustrating separately certain of the parts shown in Fig. 4.

In a convenient embodiment of the present invention, a stationary chuck or gripping device is mounted upon the bed of the machine to grip the work at a position near to the point at which it is cut. This stationary gripping element involves a stationary jaw 1 and a vertically moving jaw 2. The vertically moving jaw 2 is adapted to be operated by a lever 3 disposed substantially horizontally. This lever is pivoted at a position intermediate its ends. One end is suitably connected, as by a pin 4 working in an elongated slot, to the moving jaw; the other end is adapted to be operated from a cam through the medium of a vertically moving rod 5 which carries an anti-friction roller $5^a$ and is mounted in a bracket $5^b$ secured to the frame of the machine. This other end of the lever carries an adjustment screw 7 or stud which engages with the upper extremity of the vertically moving rod 5. $3^a$ is a spring which retains the rod 5 in relation to the cam 6.

The other gripping element is carried by a slide 8 movable longitudinally of the bed of the machine. This slide carries the fixed jaw 9 and the vertically movable jaw 10, and the latter is adapted to be operated by a lever 11 disposed substantially horizontally and pivoted upon a bracket $8^a$ secured to the slide 8. One end of this lever 11 coöperates with the vertically moving jaw 10, as for instance by being furnished with an elongated slot $11^a$ in which a pin 12 provided in a lug 13 of the member 10, engages; the other arm of the lever 11 is adapted to be operated from a cam 15 through the medium of a vertically moving rod 14 carrying an anti-friction roller $14^a$, and mounted in a bracket $14^b$ fixed to the frame of the machine. This vertically moving rod carries at its upper extremity an adjustment screw 16 or stud which engages with the substantially horizontal under surface of the arm of the lever 11. A spring $22^a$ may be suitably incorporated to retain the arm 22 of the lever 11 in contact with the thread of the screw 16.

In the case of the jaw 10, and also in the case of the jaw 2, a gripping member 17 may be provided. This gripping member 17 may be adapted to form contact with the work and it is capable of a slight movement in relation to the jaw 10 in order to enable the latter to effectively grip the work. The gripping member 17 is advantageously of channel shape, and between said gripping member 17 and a recessed part of the under surface of the jaw 10, a rubber cushion 18 is inserted. The member 17 is retained in relationship to the jaw 10 with the cushion 18 partially compressed by screws 19. These screws pass through perforations in flanges 20 provided upon the limbs of the member 17 and engage with the ends of a pin 21 which is mounted in, and which passes through, the jaw 10.

The arrangement is such that when the arm 22 of the lever 11 with which the vertically moving rod 14 engages is displaced upwardly into the position in which the work is gripped, the under surface of this arm 22 of the lever assumes a horizontal position so that the slide 8 can move longitudinally in relation to the operating rod 14, during which time the under surface of the arm 22 of the lever 11 slides upon the top of the operating rod so that the latter maintains the lever in the position for gripping the work throughout the longitudinal movement of the slide 8. Suitable provision, such as a pin 47 engaging with the key-way 48, is incorporated to prevent the members 5 and 14 from rotating in the brackets by which they are carried.

The slide 8 is adapted to be advanced to feed the work by a cam 23 through the medium of a lever or upwardly extending arm 24 and link 25 and is adapted to be displaced in its reverse movement by a spring 26. The lever 24 may have one depending arm 27 engaging with a cam 23 and there may be two upwardly extending arms 24, one on each side of the bed of the machine, such upwardly extending arms being adapted to operate collectively by reason of their being connected together by a shaft 28. A link 25 is provided in connection with each of the upwardly extending arms, so that the slide 8 is operated from both sides of the bed of the machine. The slide 8 is limited in its reverse movement by an adjustable stop 29. This stop 29 may consist of two nuts or collars locked together upon a threaded rod carried by the slide 8. This threaded rod passes through a stationary boss 30 fixed to the bed of the machine. Two other nuts or collars 31 may be assembled upon the rod which is carried by the slide 8. The spring 26 thus draws the slide 8 rearwardly throughout the precise distance of feed which is required in connection with the work. The cams 6 and 15 are adapted to operate the gripping members alternately so that while the rod is being fed, the stationary gripping member is released; the rod is gripped by the stationary gripping member while the slide 8 is receding under the influence of the spring 26. The cams 6, 15 and 23 for operating the slide 8 and the two levers by which the gripping devices are actuated may all be mounted upon a common shaft 32 driven through gearing 33 from a transverse shaft 34 carrying fast and loose belt pulleys 35.

To the side of the stationary gripping element a bearing 36 is provided for the shaft of the rotary saw or cutter 37. This bearing is carried by a downwardly extending arm 38 pivotally mounted upon the frame of the machine at a position 38$^a$ between the axis of the cutter and the lower extremity of said arm. Such lower extremity of said arm carries an adjustable screwed stem 39 adapted to be locked in varying positions longitudinally of its axis by nuts, and which screwed stem carries a roller 40 adapted to engage with a cam 41, which may be mounted upon the shaft 32 carrying the cams previously referred to. This cam 41 is adapted to feed the saw or cutter 37 toward the work. The saw or cutter receives its motion from a shaft mounted in a fixed bearing 42, which shaft carries fast and loose belt pulleys 43. Between this shaft in the fixed bearing 42 and the shaft in the bearing 36 which moves toward and away from the work, a coupling is provided involving two universal joints 44 and an intermediate telescopic part 45 so that the cutter 37 is thus effectively driven irrespective of the movements of its axis. 46 is a spring which retains the roller 40 in contact with the cam 41.

What I claim as my invention and desire to secure by Letters Patent is:—

1. A tool mounted for rotation and also for movement toward and from the work, a shaft mounted for rotation, means including a member revolved by said shaft to impart such movement to the tool; a relatively fixed work holder including a movable work gripping element; means including a member revolved by said shaft to impart gripping and releasing movement to such element; a slidably mounted work holder and feeder movable axially with respect to the tool and including a movable work gripping element, means including a member revolved by said shaft to impart sliding movement to the said slidably mounted work holder and feeder, and means also including a member revolved by said shaft to operate the work gripping element of said slidably mounted work holder and feeder.

2. A tool mounted for rotation and also for movement toward and from the work, a spring to move the tool in one direction, a shaft mounted for rotation, means including a member revolved by said shaft to move the tool in the reverse direction; a relatively fixed work holder including a movable work gripping element; means, including a member revolved by said shaft to impart gripping and releasing movement to such element; a slidably mounted work holder and feeder movable axially with respect to the tool and including a movable work gripping element, a spring to move said movable work holder and feeder in the opposite direction from the tool, means including a member revolved by said shaft to move said work holder and feeder toward the tool, and means, also includnig a member revolved by said shaft to operate the work gripping element of said slidably mounted work holder and feeder.

In witness whereof I have hereunto set my hand in the presence of two witnesses.

SIDNEY P. BLANCKENSEE.

Witnesses:
ARTHUR H. BROWN,
EDGAR N. WHEELER.